United States Patent [19]

Foster et al.

[11] 4,224,192

[45] Sep. 23, 1980

[54] METHOD FOR PREPARING A MODIFIED ALUMINA CATALYST SUPPORT AND A COMPOSITION COMPRISING SAID SUPPORT AND A CATALYST

[75] Inventors: Alan I. Foster, Ashford; John J. McCarroll, Camberley; Stephen R. Tennison, Weybridge, all of England

[73] Assignee: The British Petroleum Company Limited, Sunbury on Thames, United Kingdom

[21] Appl. No.: 972,913

[22] Filed: Dec. 26, 1978

[30] Foreign Application Priority Data

Jan. 17, 1978 [GB] United Kingdom ............... 01769/78

[51] Int. Cl.$^3$ ....................... B01J 21/04; B01J 23/40; B01J 23/74
[52] U.S. Cl. ................................. 252/466 B; 252/463; 252/466 PT
[58] Field of Search .............. 252/463, 466 J, 466 PT, 252/466 B; 423/628

[56] References Cited

U.S. PATENT DOCUMENTS

| | | | |
|---|---|---|---|
| 2,270,504 | 1/1942 | Burk et al. .......................... | 252/466 J |
| 2,449,295 | 9/1948 | Gutzeit ............................... | 252/466 J |
| 3,779,947 | 12/1943 | Mitsche et al. .................. | 252/466 PT |
| 4,056,575 | 11/1977 | Camberley et al. .............. | 260/673.5 |
| 4,056,576 | 11/1977 | Camberley et al. .............. | 260/683.3 |

*Primary Examiner*—W. J. Shine
*Attorney, Agent, or Firm*—Morgan, Finnegan, Pine, Foley and Lee

[57] ABSTRACT

A modified alumina catalyst support is prepared by mixing a Solution A containing alkali, a Solution B containing a salt of a modifying metal of Group 111A, other than aluminium, or V111 other than a platinum group metal, of the Periodic Table, and a Solution C containing a aluminium salt, to form a precipitate, ageing the precipitate, separating the precipitate from the supernatant liquor and calcining the precipitate. A platinum group metal may be added to the support and the resulting catalyst is suitable for catalyzing hydrocarbon conversation processes, particularly catalytic reforming.

4 Claims, 3 Drawing Figures

METHOD FOR PREPARING A MODIFIED ALUMINA CATALYST SUPPORT AND A COMPOSITION COMPRISING SAID SUPPORT AND A CATALYST

This invention relates to a novel catalyst support, to a novel catalyst based on the support and to novel hydrocarbon conversion processes utilising the catalyst.

Catalysts of a platinum group metal, particularly platinum or palladium, on a refractory support are well known. The metal, which may be present in an amount of 0.01 to 5% wt, has good activity for hydrogenation or dehydrogenation and dehydrocyclisation depending on the process conditions. By a suitable choice of support, additional functions, e.g., isomerisation and cracking can be given to the catalyst. The preferred support for reforming catalysts is alumina, with or without 0.1 to 5% wt of a halogen, preferably chlorine.

For many years platinum was the sole metallic component of reforming catalysts but rhenium was subsequently employed as an additional component. The main effect of the rhenium was to improve the stability of the catalyst to reactivation allowing operation under more severe conditions, e.g., lower hydrogen: hydrocarbon molar ratios and lower pressure. After the introduction of rhenium, other metals have been proposed as stabilising components of reforming catalysts, notably tin, lead and germanium.

We have now discovered that adding certain transition metals to an alumina support during instead of after its preparation results in a catalyst support which, when a platinum group metal is deposited on to it, gives a catalyst of improved activity.

Thus according to one aspect of the present invention there is provided a method for preparing a modified alumina catalyst support which method comprises the steps of mixing a Solution A containing alkali, a Solution B containing a salt of a modifying metal of Group IIIA, other than aluminium, or VIII, other than a platinum group metal, of the Periodic Table, and a Solution C containing an aluminium salt, to form a precipitate, ageing the precipitate, separating the precipitate from the supernatant liquor and calcining the precipitate.

Solution B may be added separately or combined with Solution A or Solution C, provided that it is added before the precipitate is formed.

By alkali is meant a compound of ammonia or an alkali metal which dissolves in water to give an aqueous solution having a pH greater than 7.

The Periodic Table employed is Mendeleer's Periodic Table.

The preferred alkali is ammonium hydroxide. The alumina will probably be in the form of eta-alumina after calcination.

The preferred Solution A is an aqueous solution of ammonium hydroxide having a pH in the range 7.5 to 10, preferably about 9.5.

Solutions B and C preferably contain the modifying metal salt and the aluminium salt in aqueous solution in concentrations in the range 0.1 to 5 g/liter.

The weight ratio of the modifying metal salt to the aluminium salt is calculated to give a catalyst support containing 0.1 to 10% by weight of the total catalyst support of the modifying metal.

Suitable aluminium salts from which alumina may be prepared include inorganic salts such as the nitrate, sulphate and chloride.

Preferred modifying metals are gallium and cobalt. Suitable salts of these include the nitrate, sulphate and chloride.

The alumina is preferably prepared by the method of MacIver, Tobin and Barth—Catalytic Aluminas, I. Surface Chemistry of Eta and Gamma Alumina, Journal of Catalysis, Vol. 44, Part 3, page 392 (1976).

The catalyst support as prepared has a moderate acidity to promote, when used as a support for a reforming process, the desirable side-reactions of isomerisation of naphthenes and paraffins. This acidity may be supplemented, if necessary, by the addition of from 0.1 to 5% by wt of halogen, e.g., chlorine or fluorine, preferably the former. The halogen may be added by supplying a suitable quantity of hydrogen halide, e.g., hydrochloric acid, to Solution B or C.

The novel catalyst support can be used as a catalyst support for platinum group metals and the supported metal catalysts are effective for hydrogen transfer reactions.

Thus according to another aspect of the present invention there is provided a catalyst comprising (i) as support a modified alumina catalyst support prepared as hereinbefore described and (ii) as active component, 0.01 to 10% by wt, preferably 0.1 to 5% by wt, of the total weight of catalyst, of a platinum group metal disposed thereon.

By platinum group metal is meant ruthenium, rhodium, palladium, osmium, iridium and platinum. The preferred metals are platinum itself and palladium.

The catalyst may be prepared by impregnating the alumina with a solution of a reducible platinum group metal compound and reducing the compound to the metal.

Suitable solutions include aqueous solutions of tetrammine platinous chloride, platinum tetrammine hydroxide and chloroplatinic acid. Suitable conditions for impregnation are temperatures of 20° to 90° C., times of 1 to 6 hours and solution concentrations of $10^{-4}$ to 1 molar. After the impregnation, the catalyst precursor may be dried, e.g., at 100° to 250° C. for 1 to 24 hours.

Desirably the catalyst is reduced before use, preferably in situ in a reactor by heating in a reducing atmosphere, e.g., a stream of hydrogen flowing at a rate in the range 500 to 10,000 v/v/hr at a temperature in the range 200° to 550° C. for a length of time in the range 1 to 24 hours.

Catalysts produced by the above process may be used in many hydrocatalytic processes for the conversion of hydrocarbons. Such processes include hydrogenation, dehydrogenation, dehydrocyclisation, and hydrocracking.

Thus according to another aspect of the invention there is provided a hydrocarbon hydrogen transfer process which process comprises contacting the hydrocarbons under conversion conditions with a catalyst as hereinbefore described.

The catalyst is, as previously stated, particularly suitable for catalytic reforming.

The feedstock for the reforming process is suitably a gasoline fraction boiling in the range 15% to 204° C., particularly one boiling in the range 70° to 170° C. The feedstock preferably has a low sulphur content, e.g., a sulphur content of less than 5 ppm.

Broad and preferred ranges of process conditions for reforming are as follows:

|  |  | Broad Range | Preferred Range |
|---|---|---|---|
| Temperature | °C. | 200–650 | 400–600 |
| Pressure | bars (ga) | 1–210 | 1–70 |
| Space Velocity | v/v/hr | 0.01–20 | 0.1–10 |
| $H_2$:Hydrocarbon mole ratio | | 0.01:1–20:1 | 0.5:1–10:1 |

The catalyst is also suitable for use in hydrogenating aromatic compounds such as benzene and other compounds such as olefins and acetylenes.

Broad and preferred ranges of process conditions for hydrogenation are as follows:

|  |  | Broad Range | Preferred Range |
|---|---|---|---|
| Temperature | °C. | 0–400 | 50–300 |
| Pressure | bars(ga) | 1–210 | 20–150 |
| Space Velocity | v/v/hr | 0.01–20 | 0.1–10 |
| $H_2$: Hydrocarbon mole ratio | | 0.01:1–20:1 | 0.5:1–10:1 |

SPECIFIC DESCRIPTION OF THE INVENTION

Figure 1:
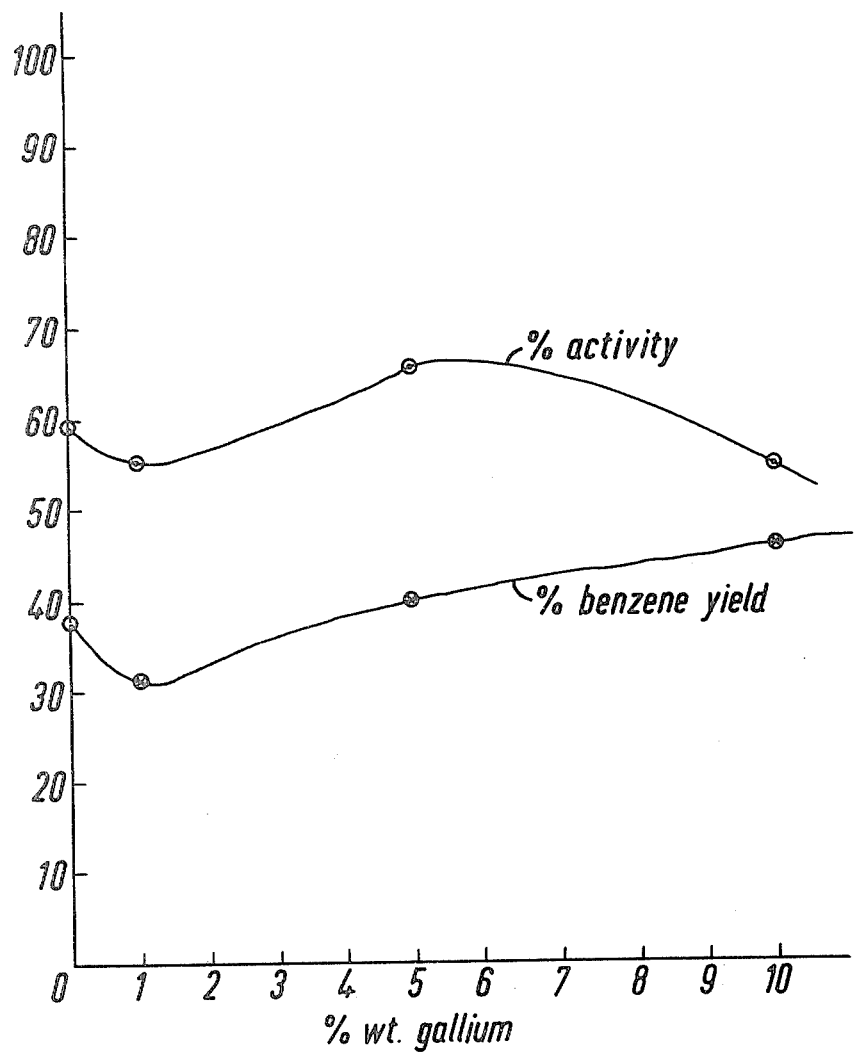
FIG. 1 shows graphically the effect of varying concentrations of gallium added during the alumina preparation on the activity and benzene yield of the catalysts.

The invention is illustrated with reference to the following Examples.

EXAMPLE 1

Platinum on Alumina Catalyst

A solution of aluminium nitrate was added to ammonium hydroxide with a sufficient excess of the hydroxide to maintain the pH at approximately 9.5. After standing for 20 hours, the precipitate was filtered, washed and left standing in distilled water for 12 hours. After refiltering it was dried at 120° C. for 72 hours.

The resulting bayerite was then converted to eta-alumina by thermal decomposition at 600° C.

The base catalyst was then prepared by adding 0.7% Pt to the eta-alumina from an aqueous solution of chloroplatinic acid, drying at 120° C. and calcining at 550° C.

EXAMPLE 2

Platinum on Gallium in Alumina Catalysts

A series of catalysts was prepared in which gallium was incorporated in the alumina. This was done by adding gallium nitrate solutions to the ammonium hydroxide solution of Example 1.

The remaining preparation of the alumina and the addition of Pt was as described in Example 1.

The amounts of gallium nitrate were calculated to give 1, 5 and 10% weight Ga in the finished alumina.

EXAMPLE 3

Platinum on Cobalt in Alumina Catalysts

The catalysts were prepared as described in Example 3 with the difference that gallium was replaced by cobalt.

EXAMPLE 4

Platinum on Gallium in Halogenated Alumina Catalysts

The method of preparation was similar to that of Example 3 with the additional feature that the aluminium nitrate and the gallium nitrate were dissolved in 1% hydrochloric acid.

EXAMPLE 5

Platinum on Gallium on Alumina Catalyst

This catalyst was prepared by the procedure of Example 1 with the additional feature that 1.0% weight gallium was added to the prepared eta-alumina at the same time as the chloroplatinic acid.

EXAMPLE 6

The reaction used in testing the catalysts was the conversion of methylcyclopentane to benzene. This reaction took place at a temperature of 500° C. and a pressure of 20 psig. The methylcyclopentane was fed in at a liquid feed rate of 3.30 ml/hr. The hydrogen:hydrocarbon feed ratio was 10:1 giving a gas throughput of 132 ml/min at ambient temperature and pressure. The hydrocarbon:catalyst ratio was 4:1 requiring a volume of 0.825 ml of catalyst (LHSV=4).

Figure 2:
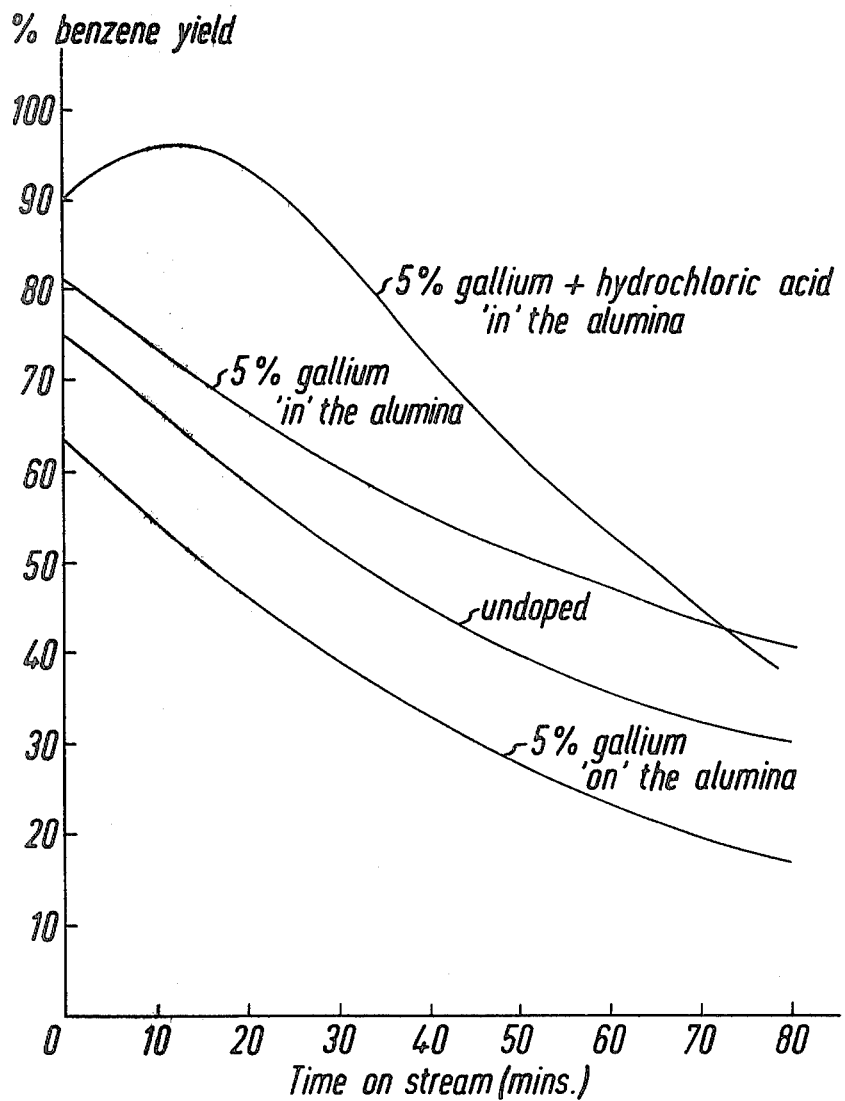
FIG. 2 compares graphically the benzene yield of the undoped reference catalysts with 5% gallium in the alumina, 5% gallium+chlorine in the alumina and 5% weight gallium added at the same time as the Pt.
Figure 3:
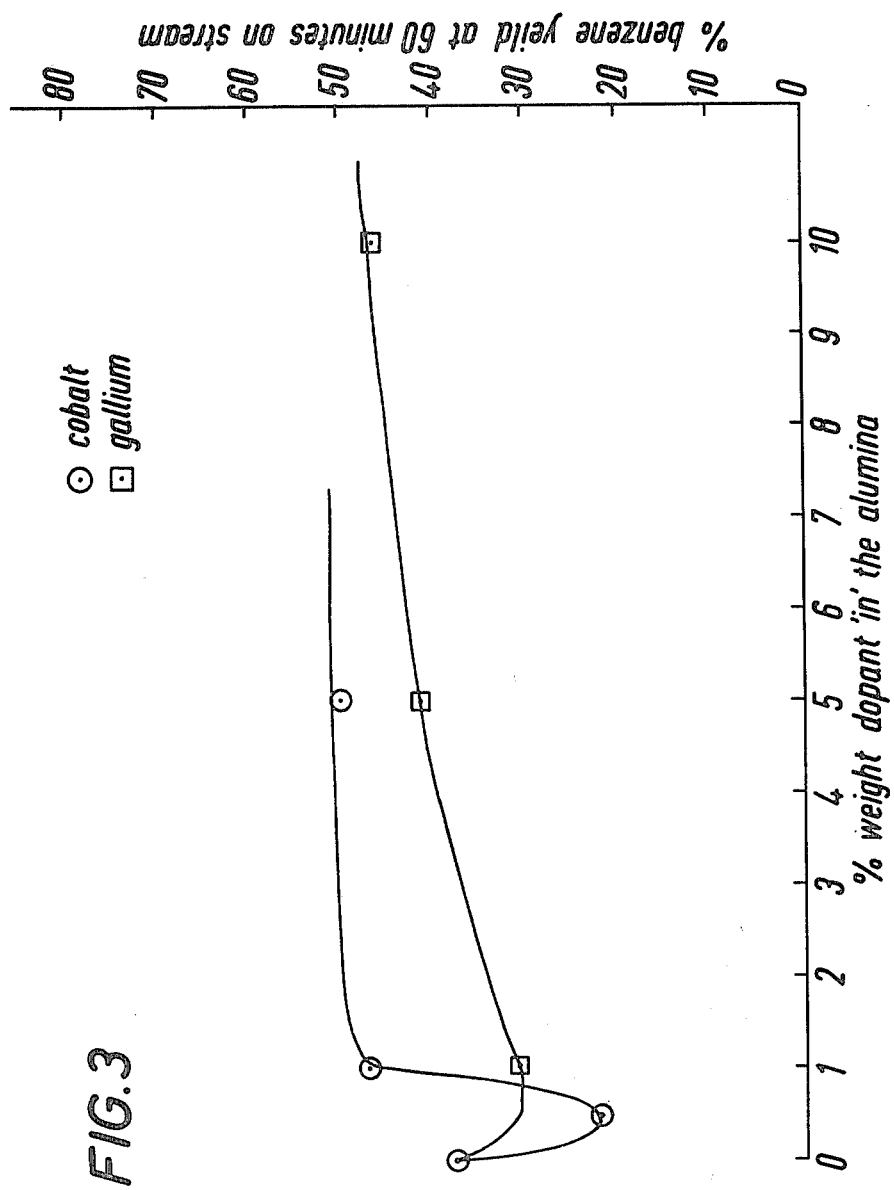
FIG. 3 shows graphically the effects of differing levels of cobalt and gallium on the benzene yield as a function of dopant concentration after 60 minutes on stream.

The results obtained are set out graphically in the accompanying FIGS. 1–3.

We claim:

1. A method for preparing a modified alumina catalyst support which method comprises the steps of mixing a Solution A containing alkali, a Solution B containing a salt of a modifying metal of Group IIIA other than aluminium, of the Periodic Table, and a Solution C containing an aluminium salt to form a precipitate, ageing the precipitate, separating the precipitate from the supernatant liquor and calcining the precipitate.

2. A method according to claim 1 wherein the modifying metal is gallium.

3. A catalyst comprising (i) as support a modified alumina prepared by the steps of mixing a Solution A containing alkali, a Solution B containing a salt of a modifying metal of Group III-B other than aluminium, or Group VIII other than a platinum group metal, of the Periodic Table, and a Solution C containing an aluminium salt to form a precipitate, ageing the precipitate, separating the precipitate from the supernatant liquor and calcining the precipitate, and (ii) as active component, 0.01 to 10% by weight of the total weight of catalyst of a platinum group metal disposed thereon.

4. A catalyst according to claim 3 wherein the platinum group metal is platinum or palladium.

* * * * *